Nov. 20, 1956    H. S. CRIM    2,770,945
JUMP-TYPE FLOW DIVIDER FOR GAS TURBINE
POWER PLANT FUEL SYSTEM
Filed Aug. 17, 1953
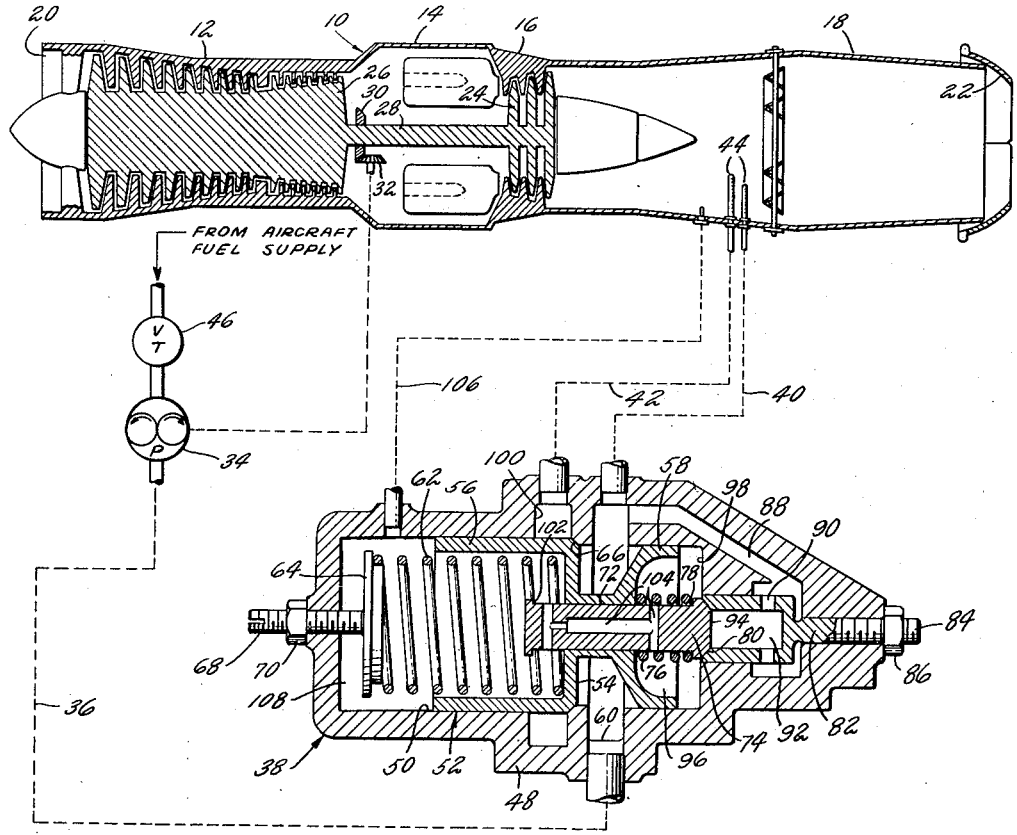
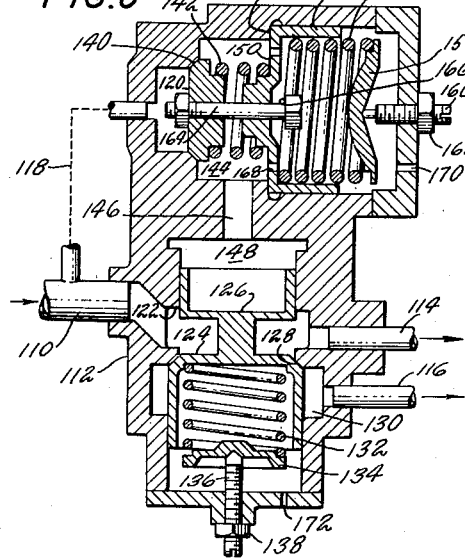
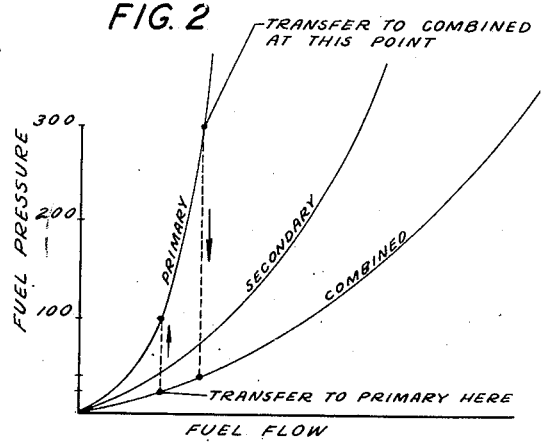
INVENTOR
HUGH S. CRIM
BY
AGENT

United States Patent Office 2,770,945
Patented Nov. 20, 1956

2,770,945

JUMP-TYPE FLOW DIVIDER FOR GAS TURBINE POWER PLANT FUEL SYSTEM

Hugh S. Crim, Glastonbury, Conn., assignor to United Aircraft Corporation, East Hartford, Conn., a corporation of Delaware Application August 17, 1953, Serial No. 374,490

12 Claims. (Cl. 60—39.09)

This invention relates to flow dividers, more particularly to a jump-type flow divider for a gas turbine power plant fuel system.

In gas turbine power plants the fuel nozzles employed in the main combustion section and in the afterburner operate over a wide range of fuel rates. There is danger of damage to combustion section and afterburner elements if fuel dribbles from the nozzles rather than being discharged therefrom in a fine spray. Dribbling results when the fuel pressure at the nozzles becomes too low, and can cause local burning or hot spots with possible damage to surrounding surfaces, or loss of power plant performance.

To provide a wide range of fuel rates in a gas turbine power plant fuel system, both a primary and a secondary fuel supply are used. When the fuel demand is high both supplies are in operation. When the fuel demand is low only the primary supply is used and by virtue of the higher pressure existing in this single supply dribbling is prevented. Fuel demand is high during operation of the power plant at sea level or at nominal altitude, during which operation there is sufficient fuel pressure to properly vaporize the fuel discharged from the nozzles in the primary and secondary supplies. As altitude increases fuel pressure drops off due to the decreasing ambient pressure until proper atomization of the fuel discharged from both supplies is no longer possible. When this occurs it is desirable to flow all of the fuel through only one supply, thus increasing the pressure in that supply and assuring proper vaporization of the fuel from the nozzles. A serious problem arises in switching from both supplies to the use of only one supply, or in switching from one supply to the use of both supplies. Unless the transition occurs rapidly, dribbling is likely to occur at the secondary nozzles.

The general object of this invention is to provide a simplified jump-type fuel flow divider which gives rapid and efficient transition between primary and combined primary and secondary operation.

Another object of the invention is to provide a simplified jump-type fuel flow divider which operates as a function of fuel pressure to give combined primary and secondary flow when a selected value of primary pressure is reached and which efficiently terminates secondary flow when primary pressure falls to a selected lower value.

Still another object of the invention is to provide a jump-type fuel flow divider which provides rapid transition between primary and combined primary and secondary operation at substantially constant fuel flow.

Other objects and advantages will be apparent from the following specification and claims and from the accompanying drawing which illustrates embodiments of the invention.

In the drawing:

Fig. 1 is a diagrammatic showing of a jump-type fuel flow divider, in accordance with this invention, as installed in the afterburner fuel supply of a gas turbine power plant.

Fig. 2 is a pressure-flow curve showing fuel flow divider operation.

Fig. 3 is an alternate construction of the fuel flow divider.

Referring to the drawing in detail, in Fig. 1 a gas turbine power plant is shown generally at 10. The power plant includes compressor section 12, combustion section 14, turbine section 16, and afterburner 18. In operation air enters inlet 20, passes through the compressor section where it is compressed and then enters the combustion section where fuel is injected and the air-fuel mixture burned. A surplus of air exists in the burning mixture in order to maintain the gases at a temperature which will not harm the turbine section, particularly rotating elements, as the gases pass from the combustion section and through the turbine section into the afterburner. Additional fuel may be injected into the gases as they pass through the afterburner to burn the excess air and to provide maximum energy recovery from the gases. The gases are finally discharged from the power plant through variable exhaust nozzle 22.

The gases passing through the turbine section drive one or more turbine rotors 24 which are connected to and drive one or more compressor rotors 26, turbine rotor 24 being connected to compressor rotor 26 by shaft 28. Gear 30 on shaft 28 meshes with gear shaft 32 which is connected to and drives afterburner fuel pump 34. The pump supplies fuel, from a source not shown, through supply manifold 36 to fuel flow divider 38 and then through primary manifold 40 and secondary manifold 42 to nozzles or spray bars 44 in afterburner 18 from which the fuel is injected into the gases passing through the afterburner. The flow of fuel from supply manifold 36 into primary manifold 40 is substantially unrestricted while the flow of fuel from the supply manifold into secondary manifold 42 is controlled by fuel flow divider 38. It is to be understood that the afterburner is not operated whenever the engine is operating, but only when required. Throttle valve 46 in the fuel system immediately upstream of fuel pump 34 is under the control of the power plant operator to admit fuel to the afterburner system whenever afterburner operation is desired.

Fuel flow divider 38 includes housing 48 having cylindrical chamber 50 therein. Piston 52 is mounted in chamber 50, the piston having groove 54 about its center portion, around which supply fuel may flow, and cupped-shaped end portions 56 and 58. Supply fuel enters housing 48 from supply manifold 36 and flows to primary manifold 40 through groove 54 as well as through annular groove 60 in the housing wall defining chamber 50. Spring 62 is mounted between left end 56 of piston 52 and adjustable abutment 64 and tends to urge the piston to the right against seat 66, the piston and seat cooperating to regulate admission of supply fuel to secondary manifold 42. The effect of spring 62 may be varied by changing the position of abutment 64, screw 68 and locknut 70 being provided for this purpose. Hole 72 extends along the longitudinal axis of piston 52 and control valve 74 is mounted within the hole and is capable of axial movement relative to the piston. Spring 76 surrounds control valve 74 and is mounted between piston end 58 and shoulder 78 on the control valve, the spring tending to force the control valve to the right with respect to the piston. The right end of control valve 74 normally is seated against beveled face 80 on adjustable seat 82, the position of the seat being adjusted by means of screw 84 and lock nut 86. Passage 88 in housing 48 is connected with annular groove 60 and supply fuel is conducted through this passage and ports 90 in seat 82 to chamber 92 defined by the seat, the left end of the chamber being closed by control valve 74. When a selected value of primary fuel pressure is reached, the pressure acting on face 94 of control valve 74 overcomes the force of spring 76 and the control valve is shifted to the left, admitting fuel to chamber 96 defined between end portion 58 of piston 52 and end wall 98 of chamber 50. The pressure of the fuel in chamber 96 acting on the relatively larger area of end portion 58 on piston 52, with respect to control valve face 94, causes the piston to jump or shift rapidly to the left, away from seat 66. This movement admits a large supply of fuel from groove 54 to annular groove 100 in the housing wall defining chamber 50 and to secondary manifold 42 connected to the groove, and preventing dribbling at nozzles 44. As piston 52 moves to the left it engages shoulder 102 on the left end of control valve 74 and carries the control valve to the left farther away from seat 82. Thus, when a selected value of primary fuel pressure has been reached, piston 52 is shifted to admit fuel to the secondary manifold to supplement the flow through the primary manifold.

Since fuel flow through the supply manifold remains constant after piston 52 has shifted to admit fuel to the secondary manifold, the increased flow area by virtue of both the primary and secondary manifolds being in operation, substantially lowers the supply fuel and primary manifold pressure. Spring 62 would tend to move piston 52 and control valve 74 to the right and close the opening between the control valve and seat 82 unless otherwise provided for. Provision is made for delaying seating of the control valve and cutting off the signal pressure to chamber 96 by selecting the ratio of areas between face 94 on control valve 74 and end 58 on piston 52, as well as the rates of springs 62 and 76, so that piston 52 is maintained in its left-most position by a fuel pressure lower than supply fuel pressure after fuel is admitted to the secondary manifold.

Fig. 2 is a curve showing operation of the fuel flow divider of Fig. 1. In this figure fuel flow is plotted against fuel pressure. As fuel flow increases supply fuel pressure, which is substantially the same as primary manifold pressure, increases. When this pressure reaches about 300 p. s. i., control valve 74 is opened and piston 52 is shifted to the left admitting fuel to the secondary manifold and causing a drop in supply and primary fuel pressure. As can be seen on the curve, this drop occurs at substantially constant fuel flow. After the transition from primary to combined primary and secondary operation, fuel pressure is about 36 p. s. i., which pressure increases as flow through the combined primary and secondary manifolds is increased. When combined fuel flow is reduced, the proper selection of control valve and piston end areas as well as spring rates, as described above, permits fuel pressure to be reduced to about 25 p. s. i. before control valve 74 closes with seat 82. At this pressure supply fuel is cut off to chamber 96 and fuel flow through the primary manifold only is restored. As with the transition from primary manifold to combined flow, the transition from combined flow to primary manifold only occurs at substantially constant fuel flow.

As fuel flow is decreased with both primary and secondary manifolds in operation, piston 52 starts to move to the right under the action of spring 62. Before the pressure falls sufficiently to permit movement of the piston to the right to close with seat 66, control valve 74 closes with seat 82, cutting off the signal pressure to chamber 96 and the right end of piston 52. Passages 104 in control valve 74 permit the trapped fuel in chamber 96 to be drained to chamber 108 at the opposite end of piston 52 and the piston, under the action of spring 62, is rapidly seated against seat 66. The rapid closing of the piston with the seat prevents dribbling of the fuel at nozzles 44. Fuel in chamber 108 is drained to the power plant by means of conduit 106.

Fig. 3 illustrates an alternate construction of the fuel flow divider of Fig. 1 in which the piston and control valve are separate units. In this figure, fuel supply manifold 110 is connected to divider housing 112 for supplying fuel to primary manifold 114 and secondary manifold 116, a branch conduit 118 from supply manifold 110 carrying supply fuel to control valve 120. Supply fuel passes from manifold 110 through annular groove 122 in housing 112 and circumferential groove 124 in piston 126 to primary manifold 114, the flow being substantially unrestricted. Piston 126 is normally closed with seat 128 in housing 112 to prevent the flow of supply fuel to annular groove 130 and secondary manifold 116 connected to groove 130, the piston being held against seat 128 by spring 132. The loading of the spring may be varied by adjusting the position of abutment 134 by screw 136 and lock nut 138.

Control valve 120 normally is held against seat 140 by spring 142. When a selected value of supply fuel pressure is reached, control valve 120 is moved to the right, away from seat 140, to admit supply fuel to chamber 144 and through passage 146 to chamber 148 at the top of piston 126. The pressure of the supply fuel in chamber 148 causes the piston to jump away from seat 128 with the result that supply fuel is rapidly admitted to secondary manifold 116. The supply fuel in chamber 144 acts upon face 150 of reset piston 152 and moves the piston to the right away from seat 154 and in opposition to spring 156 tending to hold the reset piston against the seat. The loading on spring 156 may be adjusted through adjustable abutment 158, screw 160 and lock nut 162.

Control valve 120 has a lost-motion connection with reset piston 152 through bolt 164, the bolt extending along the longitudinal axis of the control valve and the reset piston. Thus, when the pressure of the primary fuel initially opens control valve 120, the valve moves away from seat 140 without corresponding movement of reset piston 152. When the pressure of the supply fuel in chamber 144 moves reset piston 152, the piston moves to the right and finally engages shoulder 166 on bolt 164 with the result that the control valve is moved to the right farther away from seat 140 as the reset piston advances to the right.

The flow of fuel through both the primary and secondary manifolds causes a reduction in the supply fuel pressure, supply fuel flow remaining constant. In order to compensate for this decrease in supply fuel pressure and to prevent the cutting off of the signal pressure to chamber 148 and piston 126, the ratio of areas between control valve 120 and reset piston 152, and the spring rates of springs 142 and 156 for the valves, are selected so that the reset piston is held away from seat 154 by a fuel pressure lower than the supply fuel pressure after piston 126 has shifted and fuel is flowing to secondary manifold 116. The flow-pressure relationship to which the divider may operate has been discussed above in connection with Figure 2.

When control valve 120, and piston 126 have been displaced and fuel is flowing through both the primary and secondary manifolds, a decrease in supply fuel pressure will cause reset piston 152 to move toward seat 154 and piston 126 to move toward seat 128. Before the pressure falls sufficiently to permit piston 126 to close with seat 128, the reset piston allows control valve 120 to close with seat 140, thus cutting off the signal pressure to piston 126. Bleed ports 168 in face 150 of the reset piston permit draining of the fuel trapped in chambers 144 and 148 and allow piston 126 to rapidly close with seat 128, terminating the flow of fuel to the secondary manifold and preventing dribbling at the nozzles or spray bars connected to the manifold. Bleed ports 168 also permit reset piston 152 to return to its initial position against seat 154. Drain 170 is provided for draining the fuel passing through bleed ports 168 and drain 172 is provided to drain any fuel leaking past piston 126 into the chamber for spring 132.

It is to be understood that the invention is not limited to the specific embodiments herein illustrated and described but may be used in other ways without departure from its spirit as defined by the following claims.

I claim:

1. A fuel system including primary and secondary manifolds, means for supplying fuel to said manifolds, and fuel flow divider means connecting said manifolds and said supply means and controlling fuel flow to said secondary manifold, said divider including means for regulating the admission of supply fuel to said secondary manifold, means for actuating said regulating means by supply fuel pressure, supply fuel pressure responsive means for controlling the admission of supply fuel to actuate said regulating means to admit supply fuel to said secondary manifold, and means for terminating said supply fuel to said secondary manifold at a supply fuel pressure lower than the value initially actuating said regulating means.

2. A fuel flow divider including a housing, passage means therein for the flow of primary fuel, passage means for the flow of secondary fuel, a piston regulating the admission of fuel from said primary passage means to said secondary passage means, passage mean conducting primary fuel to one end of said piston, valve means in said passage means, said valve means admitting primary fuel to said piston end when primary fuel pressure reaches a selected value to shift said piston and admit fuel from said primary passage means to said secondary passage means, and means for closing said valve at a pressure lower than the selected value at which said valve is opened.

3. A fuel flow divider including a housing, passage means therein for the flow of primary fuel, passage means for the flow of secondary fuel, a piston regulating the admission of fuel from said primary passage means to said secondary passage means, one end of said piston being resiliently loaded, passage means conducting primary fuel to the opposite end of said piston, valve means in said passage means, said valve means admitting primary fuel to the end of said piston opposite said resiliently loaded end when primary fuel pressure reaches a selected value, said piston shifting under the influence of primary fuel to admit fuel from said primary passage means to said secondary passage means, and means for closing said valve means at a pressure lower than the selected value at which said valve is opened.

4. A fuel flow divider including a housing, passage means therein for the flow of primary fuel, passage means for the flow of secondary fuel, a piston regulating the admission of fuel from said primary passage means to said secondary passage means, one end of said piston being resiliently loaded, passage means conducting primary fuel to the opposite end of said piston, valve means in said passage means, said valve means admitting primary fuel to the end of said piston opposite said resiliently loaded end when primary fuel pressure reaches a selected value, said piston shifting under the influence of primary fuel to admit fuel from said primary passage means to said secondary passage means, means for closing said valve means at a pressure lower than the selected value at which said valve is opened, and means for draining fuel from between said piston and said valve means.

5. A fuel system for a gas turbine power plant including primary and secondary manifolds through which fuel is admitted to said power plant, means supplying fuel to said manifolds, and a fuel flow divider connecting said manifolds and said supply means and controlling fuel flow to said secondary manifold, said divider including a housing, a first seat formed by said housing, a piston within said housing and cooperating with said first seat to regulate fuel flow to said secondary manifold, a passage for conducting supply fuel to one end of said piston, a valve in said passage and cooperating with a second seat formed by said housing to regulate the flow of supply fuel to said piston end, said valve opening when a selected value of supply fuel pressure has been reached to admit supply fuel to said piston end, said piston being shifted away from said first seat to admit supply fuel to said secondary manifold when said valve is opened.

6. A fuel system for a gas turbine power plant including primary and secondary manifolds through which fuel is admitted to said power plant, means supplying fuel to said manifolds, and a fuel flow divider connecting said manifolds and said supply means and controlling fuel flow to said secondary manifold, said divider including a housing, a first seat formed by said housing, a piston within said housing and cooperating with said first seat to regulate fuel flow to said secondary manifold, said piston being resiliently held against said seat, a passage for conducting supply fuel to one end of said piston, a resiliently loaded valve in said passage and cooperating with a second seat formed by said housing to regulate the flow of supply fuel to said piston end, said valve opening when a selected value of supply fuel pressure has been reached to admit supply fuel to said piston end, said piston being shifted away from said first seat to admit supply fuel to said secondary manifold when said valve is opened.

7. A fuel system for a gas turbine power plant including primary and secondary manifolds through which fuel is admitted to said power plant, means supplying fuel to said manifolds, and a fuel flow divider connecting said manifolds and said supply means and controlling fuel flow to said secondary manifold, said divider including a housing, a first seat formed by said housing, a piston within said housing and cooperating with said first seat to regulate fuel flow to said secondary manifold, said piston being resiliently held against said seat, a passage for conducting supply fuel to one end of said piston, a resiliently loaded valve in said passage and cooperating with a second seat formed by said housing to regulate the flow of supply fuel to said piston end, said valve opening when a selected value of supply fuel pressure has been reached to admit supply fuel to said piston end, said piston being shifted away from said first seat to admit supply fuel to said secondary manifold when said valve is opened, and means for delaying the closing of said valve as supply fuel pressure drops so that said valve is closed at a supply fuel pressure lower than the supply fuel pressure at which said valve is opened.

8. A fuel system for a gas turbine power plant including primary and secondary manifolds through which fuel is admitted to said power plant, means supplying fuel to said manifolds, and a fuel flow divider connecting said manifolds and said supply means and controlling fuel flow to said secondary manifold, said divider including a housing, a first seat formed by said housing, a piston within said housing and cooperating with said first seat to regulate the admission of fuel to said secondary manifold, said piston being resiliently held against said seat, a passage for conducting supply fuel to the end of said piston opposite said resiliently held end, a control valve slidably mounted on the axis of said piston and regulating the admission of supply fuel to said piston, said valve opening when a selected value of primary fuel pressure is reached to admit supply fuel to said piston and, said piston being shifted away from said seat to admit fuel to said secondary manifold when said valve admits supply fuel to said piston end.

9. A fuel system for a gas turbine power plant including primary and secondary manifolds through which fuel is admitted to said power plant, means supplying fuel to said manifolds, and a fuel flow divider connecting said manifolds and said supply means and controlling fuel flow to said secondary manifold, said divider including a housing, a first seat formed by said housing, a piston within said housing and cooperating with said first seat to regulate the admission of fuel to said secondary manifold, said piston being resiliently held against said seat, a passage for conducting supply fuel to the end of said piston opposite said resiliently held end, said passage terminating in a seat, a control valve mounted on the longitudinal axis of said piston and having a lost-motion connection therewith, said valve closing said passage seat and regulating the admission of supply fuel to said piston, said valve being resiliently loaded to open when a selected value of supply fuel pressure has been reached, said piston being shifted away from said first seat to admit supply fuel to said secondary manifold when said valve is opened and means for delaying the closing of said valve as supply fuel pressure drops so that said valve is closed at a supply fuel pressure lower than the supply fuel pressure at which said valve is opened.

10. A fuel system for a gas turbine power plant including primary and secondary manifolds through which fuel is admitted to said power plant, a fuel supply for said manifolds and a flow divider controlling the admission of fuel from said supply to said secondary manifold, said divider including a housing, a chamber within said housing and having a shiftable piston therein, a spring urging said piston toward one end of said chamber, a control valve surrounded by said piston and having a lost-motion connection therewith, a spring interposed between said piston and said control valve and urging said elements apart, said control valve regulating the admission of fuel from said fuel supply to the end opposite said spring-loaded end of said piston, said piston being shifted to admit fuel to said secondary manifold when said valve admits fuel to said piston end, the ratio of valve area to piston end area and the ratio of valve and piston spring rates being selected so that said piston is held in its shifted position at a lower pressure than required to open said valve.

11. A fuel system having a primary and a secondary manifold means supplying fuel to said manifolds, the supply of fuel to said primary manifold being relatively unimpeded, a spring-loaded piston regulating admission of fuel from said fuel supply to said secondary manifold, said spring tending to hold said piston in a position closing off said secondary manifold, and valve means responsive to and actuated by supply fuel pressure regulating admission of supply fuel to one end of said piston to shift said piston and admit supply fuel to said secondary manifold, said valve means including a spring-loaded control valve directly subject to supply fuel pressure, a spring-loaded reset piston having a lost-motion connection with said control valve, said reset piston being shifted when supply fuel is admitted by said control valve to said first piston, the ratio of areas and spring rates between said control valve and said reset piston being selected so that said reset piston is held in shifted position by a pressure lower than the supply fuel pressure opening said control valve, said lost-motion connection holding said control valve open when said reset piston is shifted by supply fuel pressure.

12. A fuel system having a primary and a secondary means supplying fuel to said manifolds, the supply of fuel to said primary manifold being relatively unimpeded, a spring-loaded piston regulating admission of fuel from said fuel supply to said secondary manifold, said spring tending to hold said piston in a position closing off said secondary manifold, and valve means responsive to and actuated by supply fuel pressure regulating admission of supply fuel to one end of said piston to shift said piston and admit supply fuel to said secondary manifold, said valve means including a spring-loaded control valve directly subject to supply fuel pressure and having a lost-motion connection with said piston, said piston being shifted when supply fuel is admitted by said control valve to said piston end, the ratios of areas and spring rates between said piston and said control valve being selected so that said piston is held in shifted position by a pressure lower than the supply fuel pressure opening said control valve, said lost-motion connection holding said control valve open when said piston is shifted by supply fuel pressure.

References Cited in the file of this patent

UNITED STATES PATENTS

| | | |
|---|---|---|
| 2,578,934 | Janssen | Dec. 18, 1951 |
| 2,590,853 | Fulton | Apr. 1, 1952 |
| 2,628,472 | Dray et al. | Feb. 17, 1953 |
| 2,635,425 | Thorpe et al. | Apr. 21, 1953 |